US 6,652,224 B2

(12) United States Patent  
Mulloy et al.

(10) Patent No.: US 6,652,224 B2  
(45) Date of Patent: Nov. 25, 2003

(54) VARIABLE GEOMETRY TURBINE

(75) Inventors: John Mulloy, Columbus, IN (US); John Frederick Parker, Huddersfield (GB)

(73) Assignee: Holset Engineering Company Ltd., Huddersfield (GB)

( * ) Notice: Subject to any disclaimer, the term of this patent is extended or adjusted under 35 U.S.C. 154(b) by 11 days.

(21) Appl. No.: 10/117,872

(22) Filed: Apr. 8, 2002

(65) Prior Publication Data

US 2003/0190231 A1 Oct. 9, 2003

(51) Int. Cl.[7] ................................................ F01D 17/16
(52) U.S. Cl. ....................................................... 415/158
(58) Field of Search ................................. 415/158, 157, 415/80, 82, 146, 147, 151, 186, 191, 208.1, 208.2, 208.3, 208.5, 211.1

(56) References Cited

U.S. PATENT DOCUMENTS 5,868,552 A * 2/1999 McKean et al. ............. 415/158  
6,203,272 B1 * 3/2001 Walsham ..................... 415/158

* cited by examiner

Primary Examiner—Edward K. Look  
Assistant Examiner—Richard A. Edgar  
(74) Attorney, Agent, or Firm—Gary M. Gron

(57) ABSTRACT

A turbocharger variable geometry turbine of the type which includes nozzle vanes displaceable across the turbine inlet flow path into slots. The vanes have cut-outs which reduce the vane cord and permit peak turbine efficiency over a range of geometries.

13 Claims, 4 Drawing Sheets

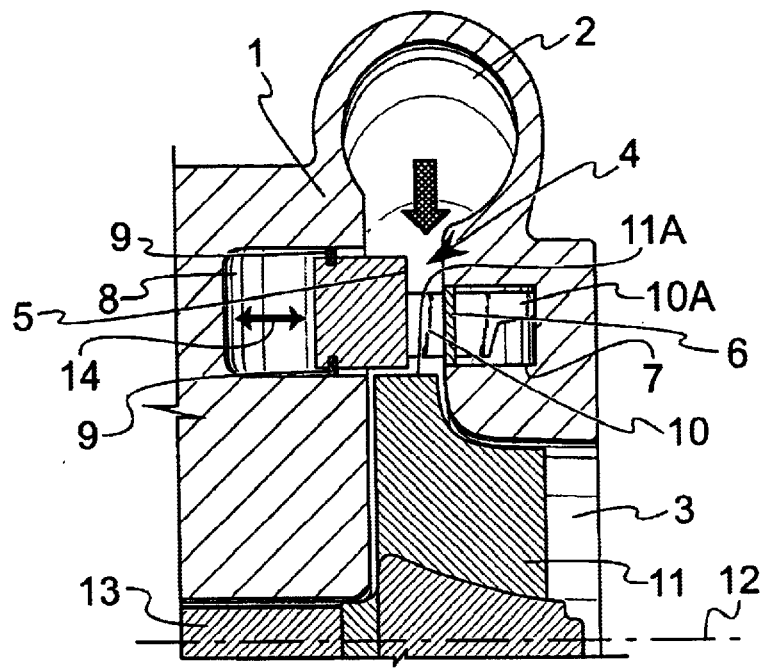
FIG. 1
(PRIOR ART)
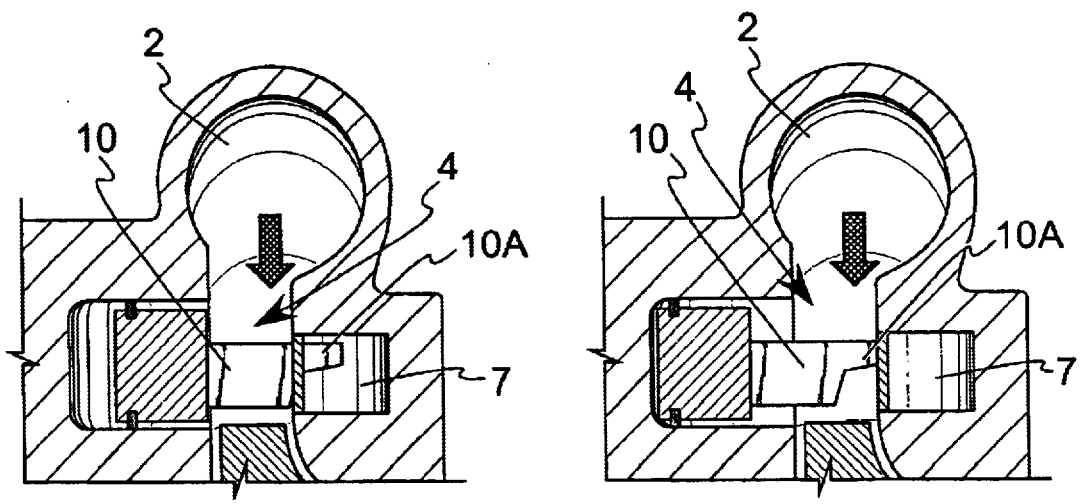
FIG. 2A
(PRIOR ART)
FIG. 2B
(PRIOR ART)

VARIABLE GEOMETRY TURBINE

FIELD OF THE INVENTION

The present invention relates to a variable geometry turbine, and in particular to a turbine of a type suitable for use in a turbocharger for an internal combustion engine. More particularly still, the invention provides advantages in turbochargers intended for internal combustion engines which have an exhaust gas recirculation system.

BACKGROUND OF THE INVENTION

Variable geometry turbines are well known and generally comprise a turbine chamber within which a turbine wheel is mounted, an annular inlet passageway arranged around the turbine chamber, an inlet chamber arranged around the inlet passageway, and an outlet passageway extending from the turbine chamber, the passageways and chambers communicating such that pressurised gas admitted to the inlet chamber flows through the inlet passageway to the outlet passageway via the turbine chamber. In one common type of variable geometry turbine, one wall of the inlet passageway is defined by a moveable wall member, generally termed "nozzle ring", the position of which relative to a facing wall of the inlet passageway is adjustable to control the width of the inlet passageway. The inlet passageway width and thus the geometry of the turbine is varied so that as the volume of gas flowing through the turbine decreases the inlet passageway width is also decreased to maintain gas velocity and hence turbine efficiency.

It is also well known to improve turbine efficiency by providing vanes, referred to as nozzle vanes, in the inlet passageway so as to deflect gas flowing through the inlet passageway towards the direction of rotation of the turbine wheel. Nozzle vanes are provided in both fixed and variable geometry turbines. In the latter case the provision of vanes complicates the variable geometry structure, in particular to ensure that the vanes always extend across the full width of the inlet passageway.

U.S. Pat. No. 4,499,732, for instance, describes a variable geometry arrangement in which the vanes are fixed in position but extend through slots in a moveable nozzle ring. Thus, as the nozzle ring moves to control the width of the inlet the vanes will always extend across the full width.

Other variable geometry structures are described for example in U.S. Pat. No. 4,292,807, and British patent specification numbers GB-A-1138941 and GB-A-2044860. These specifications describe various arrangements in which the nozzle vanes extend from a moveable nozzle ring into slots provided on the facing wall of the inlet passageway. This arrangement also ensures that the vanes always extend across the full width of the passageway, even when the passageway is fully open.

Although the provision of nozzle vanes optimises turbine efficiency, the vanes have a disadvantage of reducing the effective area of the turbine inlet so that the maximum gas flow rate through the turbine is less than would be possible if the vanes were not present. U.S. Pat. No. 4,973,223 describes a variable geometry turbine in which the nozzle ring can be "over-opened", i.e. withdrawn beyond the nominal full width of the inlet passageway, and in doing so retract the vanes at least partially from the inlet passageway. Efficiency of the turbine drops as the vanes are retracted but the increase in maximum flow rate enables a wider range of engine speeds to be matched by the turbine. Although turbine efficiency begins to drop off as the vanes are retracted from the inlet passageway, efficiency may still be greater than that achieved at the low flow range of the turbine. Essentially, therefore, controlled retraction of the vanes enables modification of the turbines characteristic efficiency verses flow curve so that for a given flow range the mean turbine efficiency may be increased by avoiding the need to operate the turbine in the less efficient low flow region.

It is also known to achieve the same effect in a simpler way, by modifying the profile of the nozzle vanes. The present applicant produces a variable geometry turbine in which nozzle vanes extend from a moveable nozzle ring which defines one wall of the turbine inlet passageway into slots defined in an opposing fixed wall of the turbine inlet passageway, and wherein the nozzle ring can be over-opened beyond the full width of the passageway. The nozzle vanes have a cut-out at their radially inner edge and towards the end of the vanes remote from the nozzle ring. This cut-out effectively reduces the height of the nozzle vane over a portion of its width (the height of a nozzle vane being its extent parallel to the axis of the turbine, i.e. the extent to which it extends from the nozzle ring). Thus there is a region towards the end of each vane which has a reduced chord, i.e. its effective width opposing gas flow from the inlet chamber to the turbine chamber. When the nozzle ring is in an open position with the inlet passageway fully opened, the reduced chord portion of the vanes extend through the slots. However, as the nozzle ring is over-opened the reduced chord region is retracted from the inlet passageway side wall so that the total effective vane area extending across the inlet passageway is reduced increasing the swallowing capacity of the turbine. By ensuring that the reduced chord region of the each vane is hidden when the inlet passageway is fully open peak turbine efficiency is not adversely affected.

Although good turbine efficiency is clearly desirable, conventional variable geometry turbine designs can be problematical when the turbine is intended for use with an internal combustion engine having an exhaust gas recirculation (EGR) system. In an EGR system a portion of the exhaust gas taken from the exhaust manifold is reintroduced into the inlet manifold of the engine for further combustion with a view to reducing engine emissions. With modern highly efficient variable geometry turbine designs the boost pressure at the inlet manifold can often exceed the exhaust gas pressure at the exhaust manifold making the reintroduction of exhaust gas to the inlet manifold problematical, for instance, requiring dedicated EGR pumps etc.

It is an object of the present invention to obviate or mitigate the above disadvantage.

SUMMARY OF THE INVENTION

According to the present invention there is provided a variable geometry turbine comprising a turbine wheel having radial blades and supported in a housing for rotation about an axis, an annular inlet passageway extending radially inwards towards the turbine wheel, the inlet passageway being defined between an annular wall of a moveable wall member and a facing wall of the housing, the moveable wall member being moveable relative to the housing to vary the width of the inlet passageway, an annular array of vanes extending across the inlet passageway, the vanes having leading and trailing edges, a width defined between the leading and trailing edges and a height extending generally parallel to the axis of the turbine wheel, wherein the height varies across the width of the vanes from a maximum to a minimum, the minimum height being less than the axial width of the turbine blade tips.

Preferably the minimum height of the vanes is greater than the minimum width of the inlet passageway.

Preferably the minimum height is defined at the trailing edge of the vanes.

Preferably the maximum height of the vanes is greater than the maximum width of the inlet passageway.

Preferably the difference between the minimum height and the maximum height is no less than the axial width of the turbine blade tips.

The vanes may have a maximum width portion and a reduced width portion and a sharp transition in vane height between the two.

The maximum vane height will generally be defined along the leading edge of the vanes. For instance the vane height may be substantially constant across part of the width of the vane adjacent the leading edge and then reduces to the minimum height adjacent the trailing edge. The vane height may also be substantially constant across a part of the width of the vane adjacent the trailing edge.

Further preferred and advantageous features of the invention will be apparent from the following description.

BRIEF DESCRIPTION OF THE DRAWINGS

A specific embodiment of the present invention will now be described, by way of example only, with reference to the accompanying drawings, in which:

FIG. 1 is a schematic illustration of part of a known variable geometry turbine;

FIGS. 2a and 2b illustrate movement of the nozzle ring of the turbine of FIG. 1;

DETAILED DESCRIPTION OF THE PREFERRED EMBODIMENTS

Figure 3:
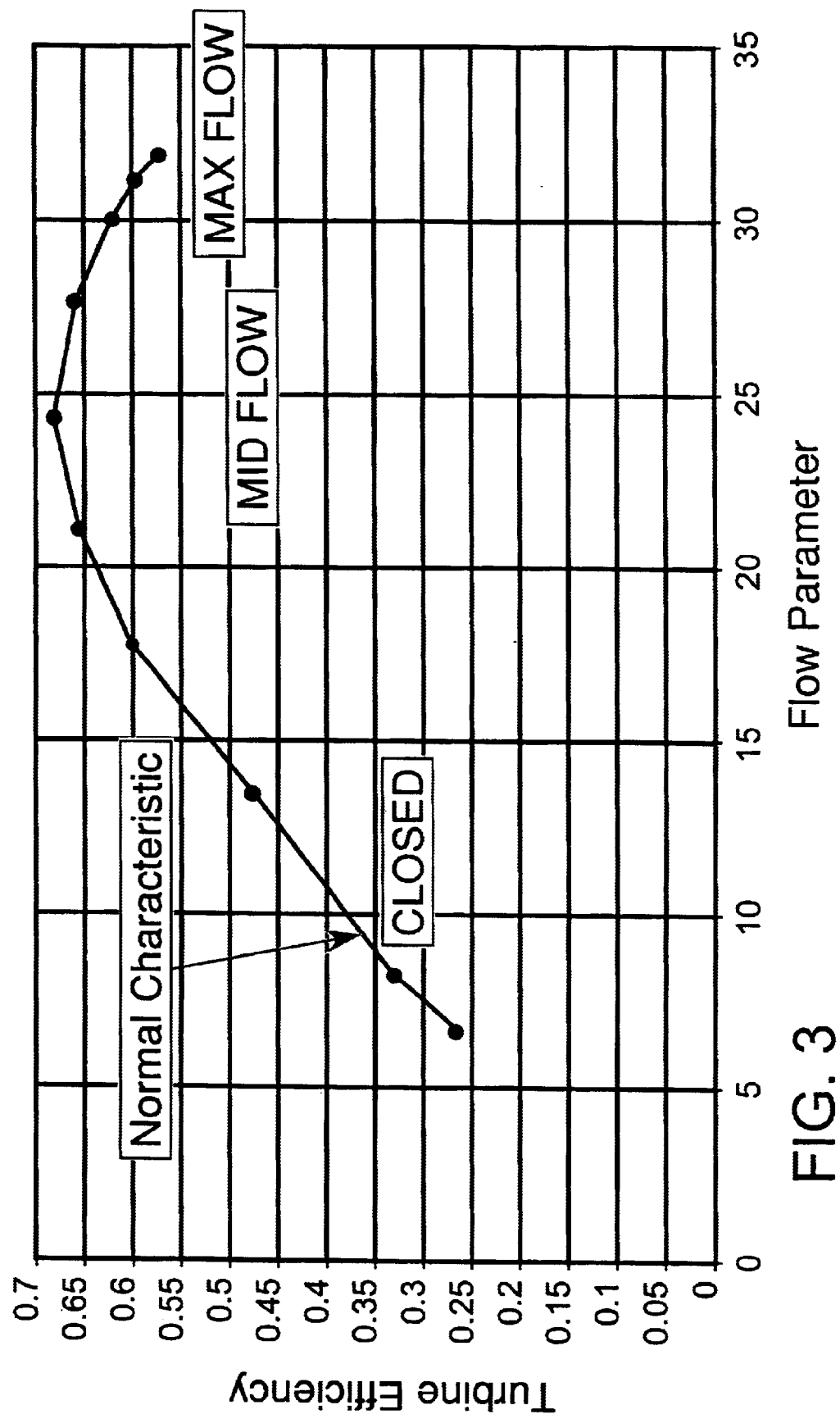
FIG. 3 is a graph illustrating the turbine efficiency verses gas flow characteristic of the turbine of FIG. 1.

Referring to FIG. 1, this is a schematic radial section through part of a known variable geometry turbine which comprises a turbine housing 1 defining a volute or inlet chamber 2 to which gas from an internal combustion engine (not shown) is delivered. The gas flows from the inlet chamber 2 to an axial outlet passageway 3 via an annular inlet passageway 4 defined on one side by the radial face of a nozzle ring 5 and on the other by an annular shroud plate 6 which covers the opening of an annular recess 7 defined in the opposing wall of the housing 1. The nozzle ring 5 is slidably mounted within an annular cavity 8 provided in the turbine housing 1, and is sealed with respect thereto by sealing rings 9.

The nozzle ring 5 supports an array of nozzle vanes 10 which extend from the face of the nozzle ring 5 across the inlet passageway 4. The height of the vanes (i.e. the extent to which the vanes 10 extend axially from the face of the nozzle ring 5) is such that the vanes extend right across the inlet passageway 4, through suitably configured slots in the shroud plate 6, and into the recess 7. Each vane 10 has a width, or chord length, defined as the distance between its leading and trailing edge (i.e. radially outer and inner edges). From FIG. 1 it will be seen that each blade is cut away at its end to define a portion 10a which has a reduced height and chord length.

In use, gas flowing from the inlet chamber 2 to the outlet passageway 3 passes over a turbine wheel 11 which rotates about an axis 12 and thereby applies torque to a turbocharger shaft 13 which drives a compressor wheel (not shown). The speed of the turbine wheel 11 is dependent upon the velocity of the gas passing through the annular inlet passageway 4. For a fixed rate of flow of gas, the gas velocity is a function of the width of the inlet passageway 4, which can be adjusted by controlling the axial position of the nozzle ring 5 (i.e. by moving it back and forth as indicated by the arrow 14). Movement of the nozzle ring 5 may be controlled by any suitable actuation means. For instance, the nozzle ring 5 may be mounted on axially extending pins (not shown) the position of which is controlled by a stirrup member (not shown) linked to a pneumatically operated actuator (not shown). Since the actuator system may take a variety of conventional forms no particular actuator mechanism is illustrated.

In FIG. 1 the nozzle ring is shown in a "closed" position at which the width of the inlet passageway 4 is reduced to a minimum. In this position it will be seen that the ends of the nozzle vanes 10 abut the housing 1 within the recess 7, the reduced chordal length portion 10a of the vanes 10 being entirely received within the recess 7.

FIGS. 2a and 2b show the nozzle ring 5 in mid flow and maximum flow positions respectively. In the mid flow position illustrated in FIG. 2a it will be seen that the nozzle ring 5 is withdrawn part way into the cavity 8 so that the face of the nozzle ring 5 is flush with the wall of the housing and the inlet passageway 4 is at its maximum width. To maximise efficiency it is generally understood that the vane height should be equal or greater than the width of the turbine wheel blade tips 11a. Thus, the vanes 10 are configured so that the minimum height of the blade is sufficient to extend across the inlet passageway 4 when the inlet passageway is fully open as shown in FIG. 2a. Here only the reduced chordal length portion 10a of the blade 10 is received within the recess 7.

The swallowing capacity of the turbine can however be increased by further withdrawing the nozzle ring 5 into the cavity 8 so that the reduced chordal width portion 10a of the vanes is retracted at least partially from the recess 7 to lie within the inlet passageway 4. The total vane area obstructing gas flow through the inlet passageway 4 is thereby reduced. The maximum flow position is illustrated in FIG. 2b.

A typical efficiency verses gas flow characteristic for a turbine such as illustrated in FIG. 1 is shown in FIG. 3. This shows that the efficiency is good (although relatively low) at low flow rates when the nozzle ring 5 is around the closed position, and increases to a peak around the mid flow rate position. The efficiency then drops off as the reduced chordal portion of the nozzle vane 10 is brought into the inlet passageway, reaching a minimum efficiency at the maximum flow position illustrated in FIG. 2b.

Figure 4A:
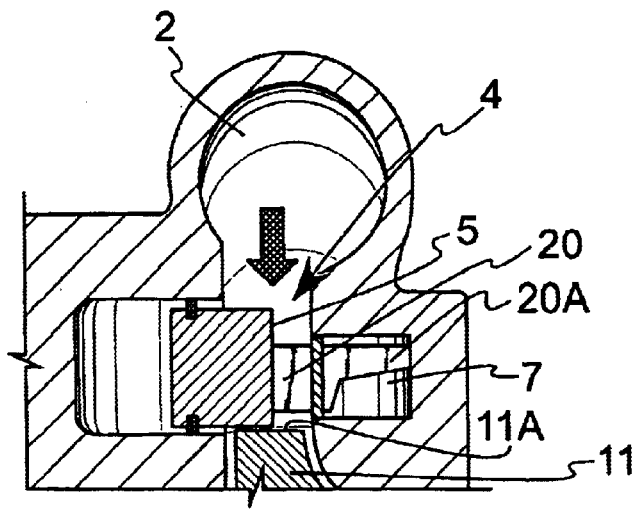
FIGS. 4a to 4c illustrate a modification of the turbine of FIG. 1 in accordance with the present invention.
Figure 4B:
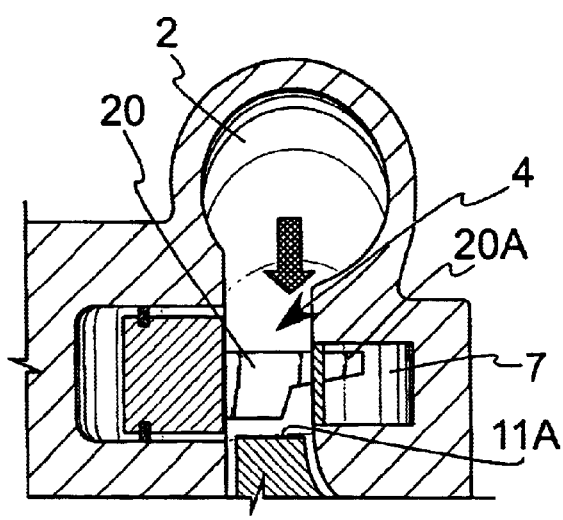

FIGS. 4a to 4b illustrate a modification to the vane profile illustrated in FIGS. 1 and 2 to modify the turbine efficiency characteristic in accordance with the present invention. Specifically, the size of the cut-out at the end of the vanes 20 is increased so that the minimum height of each vane along its trailing edge, is less than the width of the tip of the 11a of the turbine blades. The effect of this is that the reduced chordal length portion 20a of the vanes 20 extends into the inlet passageway 4 even when the inlet passageway 4 is not fully open.

Figure 4C:
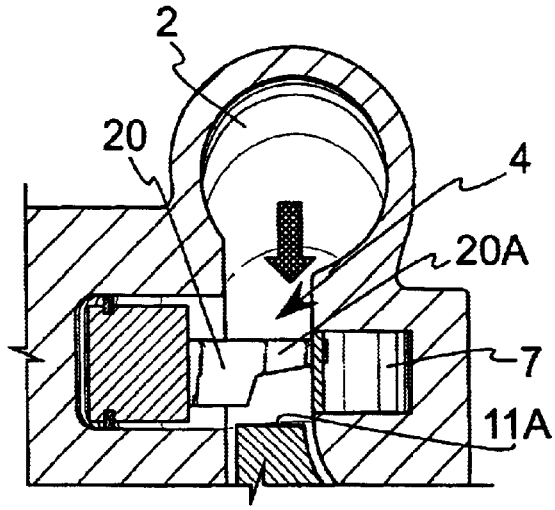

As illustrated in FIG. 4a, in the illustrated embodiment of the invention the reduced vane height has no effect when the nozzle ring is in the closed position, since the minimum height of the vane is sufficient to extend across the minimum of the inlet aperture 4. However, as the nozzle ring 5 is retracted into the cavity 8, the reduced chordal length portion 20a of each vane 20 is retracted from the recess 7 before the nozzle ring 5 reaches the mid flow position. Thus, in the mid flow position as illustrated by FIG. 4b, the reduced chordal length region of 20a of the vanes 20 already lies at least partially in the inlet passageway 4. Further withdrawal of nozzle ring 5 into the cavity 8 retracts more of the reduced chordal length portion of the nozzle ring vanes from the recess 7 until in the maximum flow position illustrated in FIG. 4c the reduced chordal length portion of the vanes 20 extends across the entire width of the turbine blade tips 11a.

Figure 5:
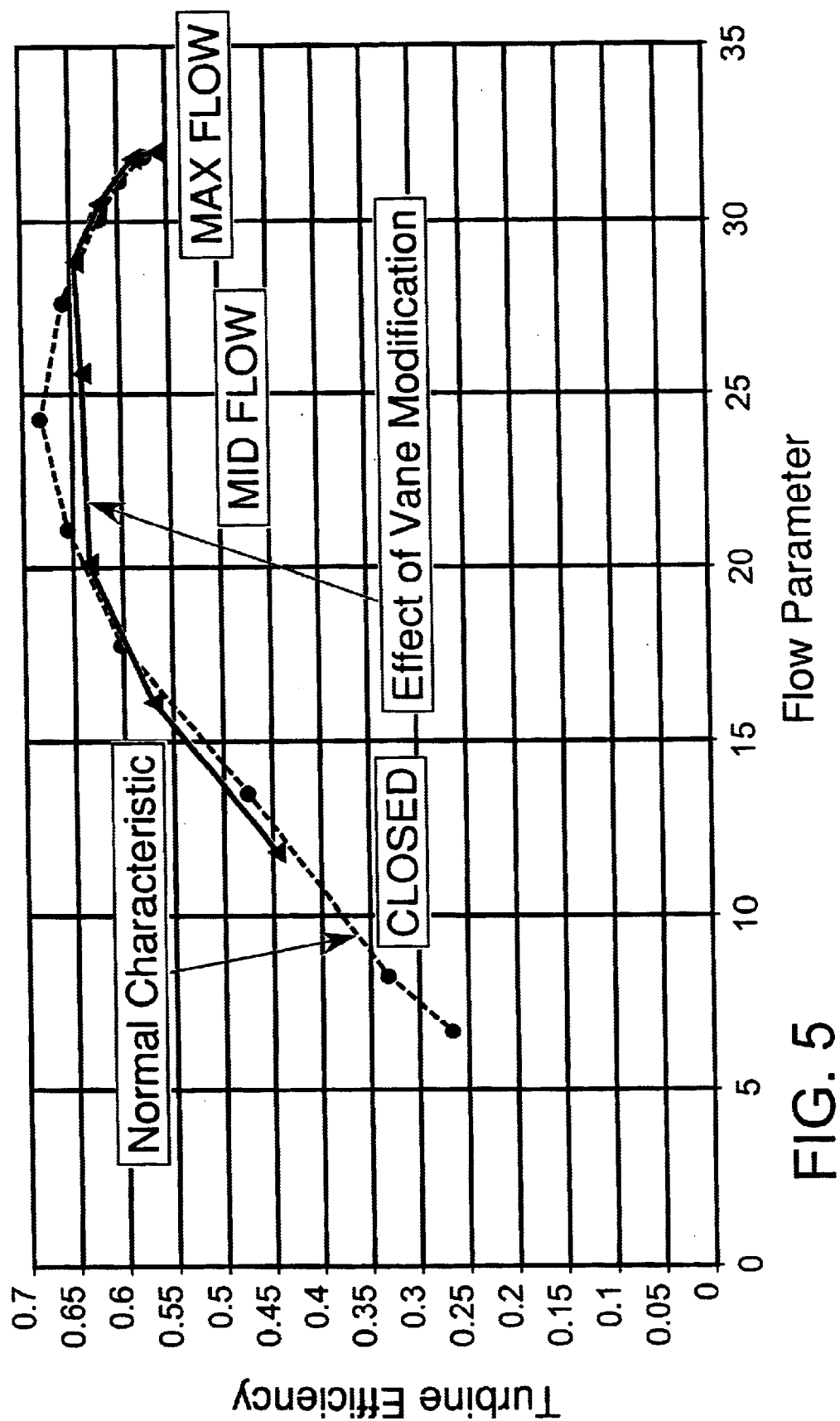
FIG. 5 is a graph illustrating the effect of the modification of FIGS. 4a to 4c on the efficiency verses gas flow characteristic of the turbine.

The effect of this modification on the characteristic efficiency verses flow curve of FIG. 3 is illustrated in FIG. 5. From this it will be seen that the turbine efficiency at low flow and max flow conditions is not significantly affected but the peak efficiency is reduced. It has been found that the reduction in peak efficiency is broadly proportional to the increase in the cut out portion of the vanes. Thus, the precise efficiency verses flow characteristic can be tailored by appropriate sizing and configuration of the cut out.

The present invention has particular advantages when applied to turbines of turbochargers intended for internal combustion engines having EGR systems as it enables the engine intake and exhaust manifold conditions to be optimised for exhaust gas recirculation, reducing emissions whilst at the same time minimising the air/fuel ratio for better fuel consumption. This is achieved by a reduction in turbine efficiency which is carefully controlled by a simple nozzle ring modification without requiring any additional parts or geometry control mechanisms.

It will be appreciated that the size and profile of the vane cut out may vary widely depending on the desired turbine characteristic.

It will also be appreciated that the invention is applicable to variable geometry turbines in which the vane is fixed in position with a moveable nozzle ring which slides over the vanes. Here the cut out can be positiond so that as the nozzle ring retracts to open the inlet passageway it reveals an increasing amount of the reduced chord length portion of the vanes.

Other possible modifications will be readily apparent to the appropriately skilled person.

Having thus described the invention, what is claimed as novel and desired to be secured by Letters Patent of the United States is:

1. A variable geometry turbine comprising a turbine wheel having radial blades and supported in a housing for rotation about an axis, an annular inlet passageway extending radially inwards towards the turbine wheel, the inlet passageway being defined between an annular wall of a moveable wall member and a facing wall of the housing, the moveable wall member being moveable relative to the housing to vary the width of the inlet passageway, an annular array of vanes extending across the inlet passageway, the vanes having leading and trailing edges, a width defined between the leading and trailing edges and a height extending generally parallel to the axis of the turbine wheel, wherein the height varies across the width of the vanes from a maximum to a minimum, the minimum height being less than the axial width of the turbine blade tips.

2. A variable geometry turbine according to claim 1, wherein the minimum height of the vanes is greater than the minimum width of the inlet passageway.

3. A variable geometry turbine according to claim 2, wherein the minimum height is defined at the trailing edge of the vanes.

4. A variable geometry turbine according to claim 1, wherein the maximum height of the vanes is greater than the maximum width of the inlet passageway.

5. A variable geometry turbine according to claim 1, wherein the difference between the minimum height and the maximum height is no less than the axial width of the turbine blade tips.

6. A variable geometry turbine according to claim 1, wherein the vanes have a maximum width portion and a reduced width portion and a sharp transition in vane height between the two.

7. A variable geometry turbine according to claim 1, wherein the maximum height is defined along the leading edge of the vanes.

8. A variable geometry turbine according to claim 7, wherein the vane height is substantially constant across part of the width of the vane adjacent the leading edge and then reduces to the minimum height adjacent the trailing edge.

9. A variable geometry turbine according to claim 8, wherein the vane height is substantially constant across a part of the width of the vane adjacent the trailing edge.

10. A variable geometry turbine according to claim 9, wherein the vanes are supported by the moveable wall member.

11. A variable geometry turbine according to claim 10, wherein said facing wall of the turbine housing is provided with an annular recess to receive said vanes as the moveable wall member is moved towards said facing wall.

12. A variable geometry turbine according to claim 11, wherein said annular recess is covered by a cover provided with slots to receive said vanes.

13. A variable geometry turbine according to claim 1, wherein the moveable wall member is mounted in an annular cavity provided within said housing, the inlet width is defined by the annular wall of the movable wall member up to the point where the annular wall lies flush with the opening of the cavity, and wherein the annular wall is further retractable into the cavity.

* * * * *